United States Patent
Soord

(10) Patent No.: US 8,363,231 B2
(45) Date of Patent: Jan. 29, 2013

(54) METHOD AND APPARATUS FOR MANAGING FONTS

(75) Inventor: Geoffrey Hammond Soord, Oxford (GB)

(73) Assignee: Software Imaging Group Limited (GB)

( * ) Notice: Subject to any disclaimer, the term of this patent is extended or adjusted under 35 U.S.C. 154(b) by 905 days.

(21) Appl. No.: 12/466,649

(22) Filed: May 15, 2009

(65) Prior Publication Data

US 2010/0014104 A1 Jan. 21, 2010

(30) Foreign Application Priority Data

Aug. 12, 2008 (EP) .................... 08170988.3

(51) Int. Cl.
G06K 15/02 (2006.01)
G06F 3/12 (2006.01)

(52) U.S. Cl. ...................... 358/1.11; 358/1.15; 358/1.16

(58) Field of Classification Search .................. None
See application file for complete search history.

(56) References Cited

U.S. PATENT DOCUMENTS

| | | | | |
|---|---|---|---|---|
| 5,592,593 A | * | 1/1997 | Speed | 358/1.11 |
| 5,671,246 A | * | 9/1997 | McIntyre | 358/1.16 |
| 6,111,654 A | * | 8/2000 | Cartier et al. | 358/1.16 |
| 7,623,253 B1 | * | 11/2009 | Oyama et al. | 358/1.14 |

* cited by examiner

*Primary Examiner* — Dov Popovici

(74) *Attorney, Agent, or Firm* — Schwegman Lundberg & Woessner, P.A.

(57) ABSTRACT

A printing system in which a font manger monitors print jobs for execution by a printer having a memory operable to store font data. The font manger is arranged to identify fonts in a print job to be executed by the printer for which font data is not already stored in the memory of the printer; and cause font data corresponding to the identified fonts to be downloaded and stored in the printer memory for use in executing subsequent print jobs. By only including font data which is not already present in the memory of a printer, the size of print jobs can be reduced thereby increasing the speed at which print jobs can be generated and transmitted. The font manger may be provided on the printer, within the computer or as part of a printer server connected to the printer and the computer via a communications network.

22 Claims, 4 Drawing Sheets

METHOD AND APPARATUS FOR MANAGING FONTS

CLAIM OF PRIORITY

The present patent application claims the priority benefit of the filing date of United Kingdom Application No. GB 0808935.1, filed May 16, 2008, and European Patent Application No. EP 08170988.3, filed Dec. 8, 2008, the entire contents of which are incorporated herein by reference in their entirety.

FIELD OF INVENTION

The present subject matter relates to managing fonts. In particular, the present subject matter relates to a method and apparatus for providing and managing fonts used by a printer.

BACKGROUND

Conventionally when printing a document from a computer, an application, such as a word processor is used to create or view the document. When a user wishes to print out the document, the application sends document data to a printer driver provided on the computer which translates the data into a format which can be utilised by a particular printer. This data is then transmitted to a printer as a print job. When a print job is received by the printer, the printer interprets the instructions included in the print job and prints a copy of the document.

In order for a printer to print characters appearing in a document in a particular font, a printer needs access to font data defining the appearance of each of the individual characters or glyphs represented in that font. In the case of a bitmap font, this font data is in the form of an array of pixels. In the case of an outline or vector font, the font data is in the form of a mathematical description of lines and curves.

Ordinarily when printing out a document, a printer driver will include this font data as part of the print job sent to a printer. In the case of certain languages such as Chinese or Japanese which include many characters, the amount of font data necessary to define all of the characters used in a language can be quite large. If this data is transmitted to a printer each time a font is to be used a significant amount of data needs to be transmitted for each print job resulting in printing delays and queues.

One way in which the systems of prior art have addressed this problem is by use of embedded fonts. Embedded fonts are fonts which are pre-stored on a printer. These embedded fonts can be utilized for printing text without the need for the relevant font glyphs having to be downloaded. The associated printer driver is provided with knowledge of which fonts are embedded within a printer and when the printer driver is asked to format a print job which uses only an embedded font, the printer driver does include font data in the data being sent to a printer.

Although the use of embedded fonts reduces the amount of data which needs to be sent to a printer, the use of embedded fonts can cause problems.

One problem with using embedded fonts is that the embedded font may not necessarily correspond with the screen font. For example, the printer may be embedded with a version of a typeface which is an older version of the font that is in use by the corresponding application. This would then mean that the screen font would be different from the printed font.

Another problem with using embedded fonts is that if the font used within a document is not one of those pre-stored within a printer, font data must still be downloaded to the printer in order for a document to be printed.

SUMMARY

Some embodiments of the present subject matter provide a printing system in which a font manger monitors print jobs for execution by a printer having a memory operable to store font data. The font manger is arranged to identify fonts in a print job to be executed by the printer for which font data is not already stored in the memory of the printer and cause font data corresponding to the identified fonts to be downloaded and stored in the printer memory for use in executing subsequent print jobs. In this way by having a computer generate print jobs which only include font data which is not already present in the memory of a printer the size of print jobs can be reduced thereby increasing the speed with which such print jobs can be generated and transmitted to a printer.

The font manger may be provided either on the printer or within the computer or as part of a printer server connected to the printer and the computer via a communications network.

BRIEF DESCRIPTION OF THE DRAWINGS

Further aspects and embodiments of the present subject matter will become apparent with reference to the following description and accompanying drawings in which.

DETAILED DESCRIPTION

Figure 1:
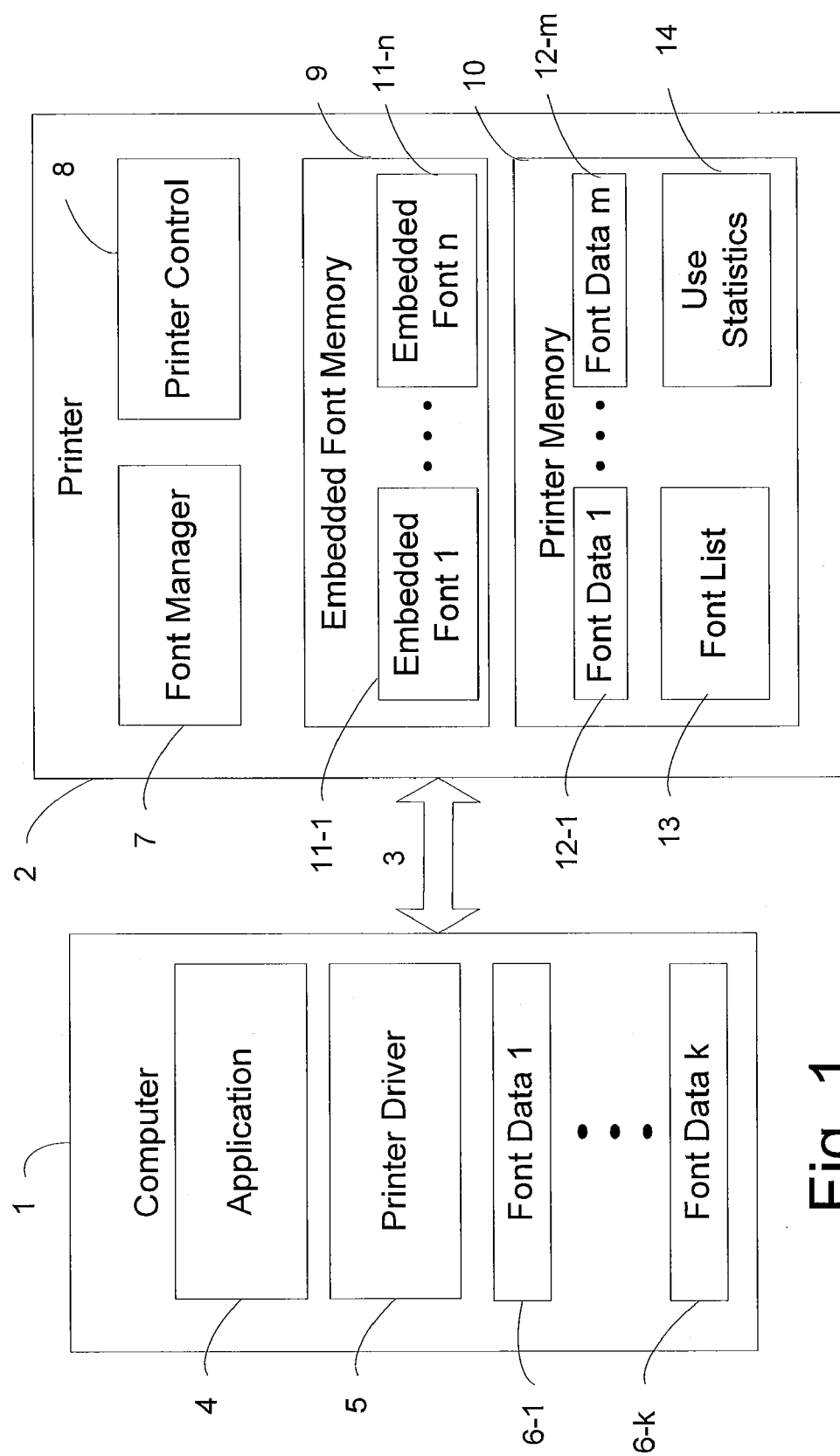
FIG. 1 is a schematic block diagram of a printer and a computer in accordance with a first embodiment of the present subject matter.

FIG. 1 is a schematic block diagram of a computer 1 connected to a printer 2 via a bidirectional communication link 3. An application 4 such as a word processor for generating documents and a printer driver 5 are stored in the memory of the computer 1 together with font data 6-1; . . . ; 6-$k$ defining the various possible fonts which might be used by the application 4.

In use when a user wishes to print out a generated document, the application 4 invokes the printer driver 5 which generates a print job for causing a document to be output by the printer 2. This print job is transferred via the bidirectional link 3 to the printer 2 which then executes the print job and prints out the document.

Provided on the printer 2 is a font manger 7 for managing font data, a printer control module 8 for processing print jobs generated by the printer driver 5 to cause the printer 2 to print a document, an embedded font memory 9 and a printer memory 10. As in a conventional printer the embedded font memory contains font data 11-1; . . . ; 11-$n$ defining the shapes of the glyphs for a number of embedded fonts. This data is pre-stored in the embedded font memory when the printer 2 is manufactured. The printer driver 5 can then be informed of the identity of these pre-stored fonts as the same embedded font data is pre-stored on all printers of the same type and takes advantage of this knowledge to formulate smaller print jobs when printing out documents using these fonts.

As is described in detail below the font manager 7 is arranged to monitor receipt of print jobs and co-ordinate the downloading of additional font data 12-1; . . . ; 12-$m$ which is stored in the printer memory 10 together with a list 13 identifying the downloaded fonts and statistical data 14 indicating the number of times a font has been used and the frequency of use of the different fonts. The font manager 7 then co-operates with the printer driver 5 so that the printer driver 5 can take advantage of the storage of these additional fonts to generate smaller print jobs when fonts in addition to the embedded fonts are used in a document. Thus in this way the speed with which the printer 2 can receive and process print jobs is increased.

The processing undertaken by the printer driver 5 and the font manager 7 which enables the printer to execute print jobs more efficiently will now be described in detail with reference to FIGS. 2 and 3.

Processing Undertaken by the Printer Driver

Figure 2:
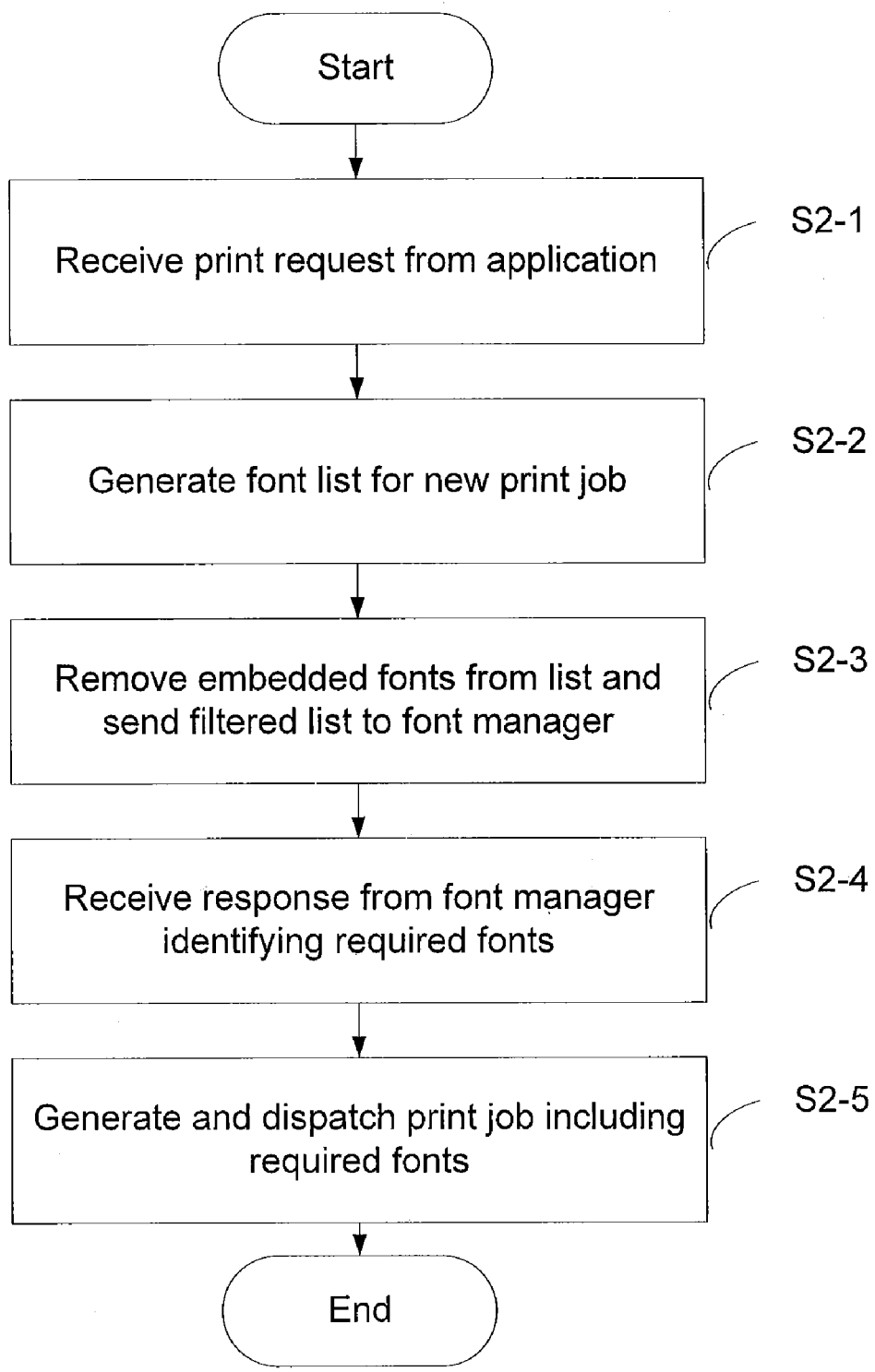
FIG. 2 is a flow diagram of the processing undertaken by the printer driver of the computer of FIG. 1 during a print job.
Figure 3:
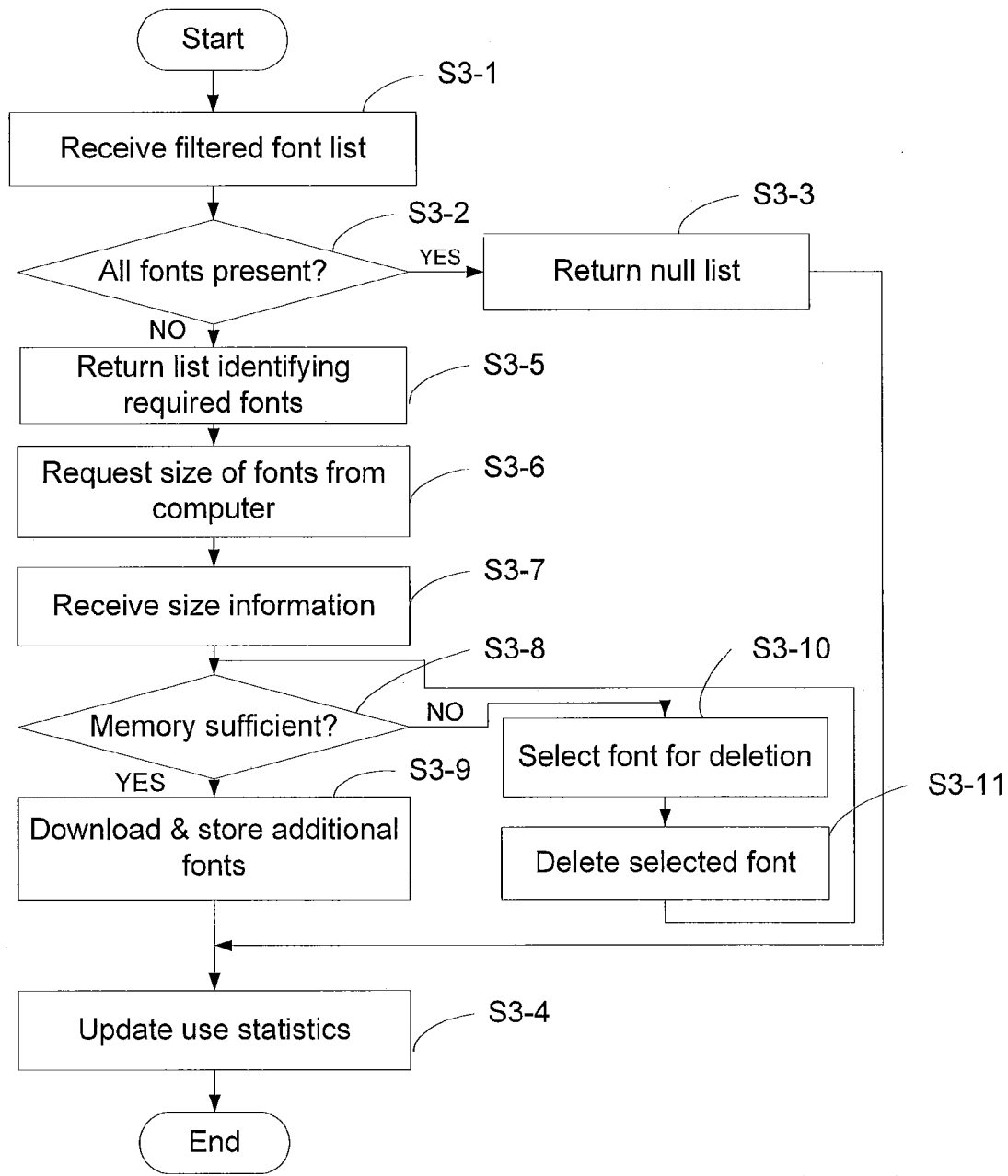
FIG. 3 is a flow diagram of the processing undertaken by the font manager of the printer of FIG. 1 during a print job.

Referring to FIG. 2 which is a flow diagram of the processing undertaken by the printer driver 5, this processing will now be described in detail.

The printer driver 5 is invoked when (s2-1) it receives a print request from the application 4 asking the printer driver 5 to formulate a print job for execution by the printer 2. When the printer driver 5 is invoked initially (s2-2) it analyses the print request and generates a list of all the fonts required to print the requested document. The printer driver 5 develops this list by identifying within the coding of the print job, the fonts which are in use.

The printer driver 5 then filters (s2-3) the generated list by removing from the list any fonts corresponding to embedded fonts 11-1; . . . ; 11-$n$ stored in the embedded font memory 9 of the printer 2. The printer driver 5 for use with a specific printer 2 will have information about the embedded fonts 11-1; . . . ; 11-$n$ as these fonts are pre-stored in the embedded font memory 9 of a printer 2 in the factory and therefore this information can be included in the printer driver 5 at the time the printer 2 is being developed. The printer driver 5 then causes the filtered list to be transmitted to the font manager 7 of the printer via the bidirectional link 3. As will be described in detail later, the font manager 7 then proceeds to utilise the received filtered list to identify the font data required to print the current print job and send this list back to the printer driver 5 via the bidirectional link 3.

When the list of required fonts has been generated by the font manger 7 and sent back to the computer 1, the list is received (s2-4) by the printer driver 5. The printer driver 5 responds to receipt of this list of required fonts by generating a print job including text and image data to be printed by the printer 2 together with the font data 6-1; . . . ; 6-$k$ corresponding to the required fonts. This print job data is then sent to the printer 2 via the bidirectional link 3 and when the print job data is received by the printer 2, the printer control module 8 utilises the received print job data together with any font data 11-1; . . . ; 11-$n$; 12-1; . . . ; 12-$m$ stored in the embedded font memory 9 or the printer memory 10 to cause the printer 2 to print out a document corresponding to the print job.

As will be described, the font manager 7 is arranged to monitor the use of fonts and request font data 6-1; . . . ; 6-$k$ from the computer 1 corresponding to fonts appearing in print jobs which are not currently stored in the embedded font memory 9 as embedded font data 11-1; . . . ; 11-$n$ or as font data 12-1; . . . ; 12-$m$ in the printer memory 10. In this way the font manager 7 is able to ensure that font data corresponding to the most frequently used fonts will be present on the printer 2 and hence does not need to be included within a print job sent to the printer 2. This reduces the size of the print jobs and hence increases the speed with which documents can be dispatched to and processed by the printer 2.

Processing Undertaken by the Font Manager

The processing undertaken by the font manager 7 to manage the downloading of font data 6-1; . . . ; 6-$k$ from the computer 1 into the printer memory 10 will now be described in detail with reference to FIG. 3 which is a flow diagram illustrating this processing.

The font manager 7 is initially invoked whenever (s3-1) the printer 2 receives a request for a list of fonts required to execute a new print job from the printer driver 5 via the bidirectional link 3. As described above, in this embodiment, this request is in the form of a list of the fonts appearing in a document to be printed out from which any fonts corresponding to embedded fonts 11-1; . . . ; 11-$n$ stored in the embedded font memory 9 have been removed.

When this list is received, the font manager 7 compares (s3-2) the received list with the font list 13 stored in the printer memory 10. As the font list 13 stored in the printer memory 10 identifies the fonts for which font data 12-1; . . . ; 12-$m$ is already stored in the printer memory 10, this comparison enables the font manger 7 to identify whether any additional font data is required to execute the requested print job.

In the event that all the fonts required exist on the printer memory 10, the font manager 7 proceeds to generate and return a null list (s3-3) to the printer driver 5 on the computer 1. As described above, receipt of such a list will cause the printer driver to generate and dispatch a print job which does not include any font data. When this print job is received by the printer 2, the printer control module 8 will then print out a document corresponding to the print job utilising the embedded font data 11-1; . . . ; 11-$n$ and the font data 12-1; . . . ; 12-$m$ stored in the printer memory 10 to generate representations of characters appearing in the document.

After the font manager 7 has dispatched a null list to the printer driver 5 on the computer 1, the font manager 7 then proceeds to update (s3-4) the use statistics 14 stored in the printer memory 10. More specifically, the font manager 7 proceeds to increment the use statistics 14 associated with each of the fonts appearing in the font list received from the printer driver 5 by incrementing the data indicating the number of times each of the fonts appearing in the list has been used by one and by setting data identifying the last time each of the fonts appearing in the list has been used to identify the current time.

If, when the font manager 7 receives a list of fonts from the printer driver 5, the font manager 7 determines (s3-2) that not all of the fonts identified by the received list correspond to fonts appearing on the font list 13 stored in the printer memory 10, the font manager 7 proceeds to generate and return a list identifying the missing fonts (s3-5) to the printer driver 5 on the computer 1.

As described above, receipt of such a list will cause the printer driver 5 to generate and dispatch a print job which includes font data 6-1; . . . ; 6-$k$ for these missing fonts. When this print job is received by the printer 2, the printer control module 8 will then print out a document corresponding to the print job utilising this font data 6-1; . . . ; 6-$k$ and the embedded font data 11-1; . . . ; 11-$n$ and the font data 12-1; . . . ; 12-$m$ stored in the printer memory 10 to generate representations of characters appearing in the document.

After the font manager 7 has dispatched the list of required fonts to the printer driver 5, the font manager 7 then (s3-6) generates and dispatches a further message to the printer driver 5 requesting size information about the required fonts. In this embodiment, this request for size information is generated and dispatched separately from the return of a list of required fonts to the printer driver 5 so as to reduce the amount of processing required by the printer driver 5 to complete and generate a print job and hence avoid any delays which could be generated by requiring a printer driver 5 undertake additional processing prior to the dispatch of print job data. In other embodiments, a printer driver 5 could be arranged to respond automatically to receipt of a required font list by determining the size of the font data 6-1; . . . ; 6-$k$ corresponding to the required fonts.

After a request for size information has been dispatched (s3-6) by the font manager 7, the font manager 7 then waits for the required information to be received from the printer driver 5. When the size information is received (s3-7) the data will identify for each of the fonts appearing in the previously dispatched required font list, data identifying the amount of memory required to store each of the identified fonts.

Upon receipt of this size information, the font manager 7 then (s3-8) determines if there is sufficient available memory in the printer memory 10 to store the fonts identified by the required font list by comparing the amount of memory required for storing the required fonts with the amount available in the printer memory 10.

If there is sufficient memory within the printer memory 10 then the font manager 7 then sends (s3-9) a request to the printer driver 5 for the additional font data. In response the printer driver 5 will cause a copy of the font data 6-1; . . . ; 6-$k$ corresponding to the requested fonts to be transmitted via the bidirectional link 3. When this font data 6-1; . . . ; 6-$k$ is received by the printer 2 the font manager 7 causes this font data to be stored in the printer memory 10. This will ensure that the font data corresponding to the fonts appearing in the most recent print jobs is stored in the printer memory 10 and hence will enable the printer driver 5 to avoid including such data in subsequent print jobs.

If, when the font manager 7 compares the amount of memory available (s3-8) to the memory required to store additional fonts, the font manager 7 determines that the printer memory 10 does not have sufficient memory available, the font manager 7 proceeds to select (s3-10) a font for deletion from the printer memory 10. More specifically, the font manager selects font data 12-1; . . . ; 12-$m$ for deletion on the basis of the use statistics 14 stored in the memory 10.

In this embodiment, this is achieved by the font manager 7 selecting the font which have been used the fewest number of times for deletion. Where two or more fonts are identified using this test, in this embodiment the font manager 7 is arranged to select the font which has not been used for the longest amount of time. Where this does not enable the font manager 7 to select a single font for deletion, the font manager 7 will select the font occupying the greatest amount of memory which has been used the fewest number of times and which has not been used for the longest period of time.

Having selected a font for deletion, the font manager 7 then proceeds to delete the selected font (s3-11). The font manager 7 then determines once again (s3-8) whether sufficient memory is available to store font data which was requested for the latest print job. If this is not the case the font manager 7 will select (s3-10) and delete (s3-11) further fonts 12-1; . . . ; 12-$m$ from the printer memory 10 before determining once more (s3-8) whether sufficient memory is available to store the fonts required for the latest print job.

When the font manager 7 determines (s3-9) that sufficient memory is available in the printer memory 10 for the additional fonts, the font manager 7 generates and dispatches a request to the printer driver 5 via the bidirectional link 3, asking the printer driver 5 to send copies of the font data 6-1; . . . ; 6-$k$ to the printer 2. When the printer driver 5 receives such a request, the printer driver 5 responds by dispatching the requested font data 6-1; . . . ; 6-$k$ to the printer 2. When this data is received by the printer 2, the font manager 7 causes the received data to be stored in the printer memory 10 as font data 12-1; . . . ; 12-$m$ for use with subsequent print jobs.

Finally, upon storage of the received font data, the font manager 7 then proceeds to update (s3-4) the use statistics 14 stored in the printer memory 10 by incrementing use statistics associated with each of the received fonts indicating the number of times each of the fonts appearing in the list has each been used by one and by setting data identifying the last time each of the fonts appearing in the list has been used to identify the current time.

Identifying and downloading only the fonts required for a print job and storing fonts that are commonly used avoids unnecessary transmissions of fonts thereby improving printer efficacy. The download of fonts in the manner described also overcomes the problem with using embedded fonts not corresponding to the font on screen as each downloaded font will be identical to the font data used to generate a screen representation of the font.

EXAMPLE EMBODIMENT

In some of the previous embodiment, a system has been described in which a font manager 7 and a printer driver 5 are provided on a printer 2 and a computer 3 respectively. Further embodiments describe illustrating how the present subject matter may be applied to networks of computers and printers.

Figure 4:
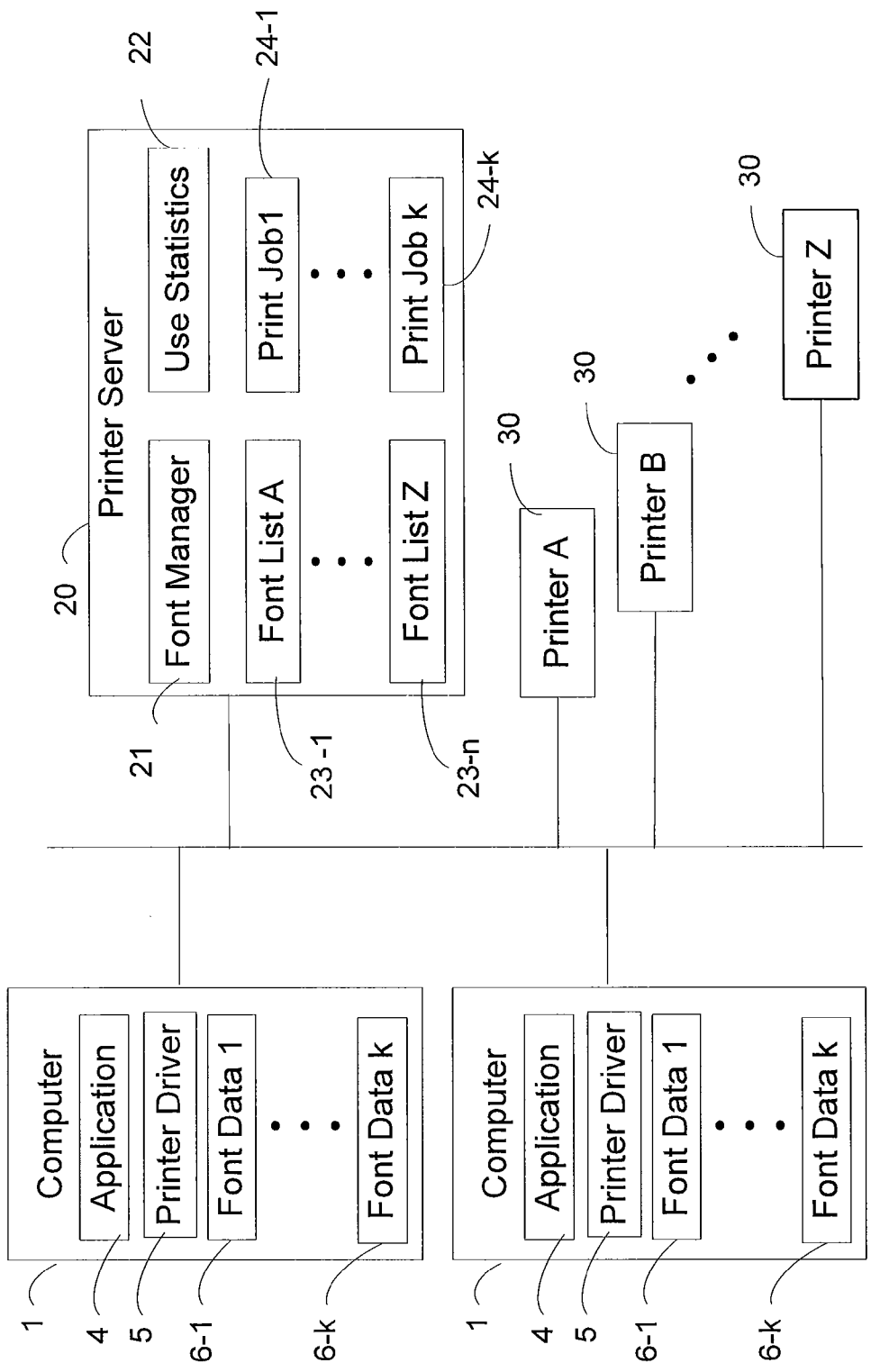
FIG. 4 is a schematic block diagram of a printer network according to a second embodiment of the present subject matter.

FIG. 4 is a schematic block diagram of a printer network with a number of computers 1 connected by a communication link to a number of printers 30 and a printer server 20. The computers 1 in this embodiment are identical to those described in the previous embodiment and each store in their memory an application 4, a printer driver 5 and font data 6-1; . . . ; 6-$k$ as previously described above.

In use when a user wishes to print out a generated document, in contrast to the previous embodiment the printer drivers 5 on each of the computers 1 are arranged to communicate with the printer server 20. The printer server 20 then processes print requests and forwards the request on to an appropriate printer 30 which then prints out a requested print job.

In order to manage the flow of font data 6-1; . . . 6-$k$ from the computers 1 to the printers 30, the printer server 20 in this embodiment is arranged to store a font manger 21, a set of use statistics 22 recording the use and storage of font data on each of the printers 30 and a font list 23-1; . . . ; 23-$n$ associated with each printer 30 identifying the fonts stored in the memory of each of the respective printers 30. The printer server 20 is also arranged to receive and stored print job data 24-1; . . . ; 24-$k$ for print jobs to be executed on the printers 30.

As in the previous embodiment, when a user wishes to print out a document, in this embodiment, the printer driver 5 present on a user's computer 1 initially transmits a list of possibly required fonts. This list is received by the printer server 20 and compared by the font manager 20 with the font list 23-1; . . . ; 23-$n$ associated with the printer 30 a user has identified that they wish to use. The font manger 21 then proceeds to process the request in a similar way to that described in the above, identifying a list of required fonts, updating use statistics and co-ordinating the download and storage of font data into the memory of the selected printer 30.

Whilst this is occurring, the printer driver 5 generates and dispatches a print job to the printer server 20. The generated print jobs 24-1; . . . ; 24-$k$ are stored in a print queue on the printer server 20 before being dispatched to a printer 30 for execution. This storage of print jobs 24-1; . . . ; 24-k enables a print job to be cancelled or rescheduled and also ensues that a copy of a print job is maintained in the event of a communications failure between the printer server 20 and a printer 30 for example when a printer 30 is switched off.

Some issues, may arise when the present subject matter is implemented in a network situation due to the possibility that network communications may fail causing instructions or data to be lost. Further it is possible that in a network environment, printers 30 might be provided with only volatile memories and hence it is possible that previously downloaded font data might be lost.

These issues can all be addressed through having a font manager 21 and network printers 30 periodically poll each other to confirm each printer's current availability.

Thus for example, each of the printers 30 could be arranged to contact the printer server 20 whenever it is initially switched on. If such a printer included only volatile memory storage, the font manager 21 could be arranged to clear the font list 23-1; . . . ; 23-n associated with a printer 30 in response to receipt of such a signal.

Similarly the printer server 20 could be arranged to check that a particular printer 30 was online prior to dispatching a print job 24-1; . . . ; 24-k to the printer 30 for execution. The printer server 20 could be arranged to suspend a print job 24-1; . . . ; 24-k until a suitable response was received from a particular printer 30. In order to manage the downloading of fonts, the printer server 20 could also be arranged to monitor for confirmation from a printer 30 that a particular print job had been executed. In such a system, if a signal was received from a printer 30 indicating that it had just been switched on, prior to receipt of a signal indicating that a print job had been completed this would indicate that a printer 30 had been switched off in this period. The font manager 21 could then be arranged to delay printing a document until the fonts relied on in a pre-existing print job were downloaded into the memory of a printer 30 to replace fonts lost when the printer 30 was switched off.

FURTHER EXAMPLE EMBODIMENTS

In addition to the above two embodiments where either a font manager 7 is located on a printer 2 or alternatively a font manager 21 is located on a printer server 20, it will be appreciated that a font manager could be provided in the memory of the computer 1 hosting a printer driver 5. The functionality of such a font manager would be similar to the font manger in the second embodiment in that the font manager would need to communicate with an external printer to co-ordinate the downloading of font data into the memory of that printer. As with the second embodiment, additional precautions would need to be taken in such a system where a printer maintained font data within a volatile memory as the printer driver and font manager would need to co-operate whenever the printer was switched off to arrange the download of further font data so that pre-existing print jobs could be executed.

Such a system could also be implemented as a network where a number of computers 1 we connected to one or more printers where each of the computers 1 was provided with a printer driver 5 and a font manager. Such a system would have the advantage that no network overhead would be required for a printer driver to communicate with its associated font manager. Further the failure of an individual font manager would only affect a single computer rather than the whole system. Where multiple font managers were provided, the font managers should be arranged to synchronise the state data identifying the fonts present on individual printers and the use of individual fonts.

Although in some of the above described embodiments a printer driver 5 is described as generating a list of fonts which are required to execute a print job, in other embodiments rather than generating a complete list a printer driver 5 could interface with a font manager 7;21 on a font by font basis.

In such an embodiment when a user selected a document to print and an application 4 invoked the printer driver 5, the printer driver 5 would then establish communication with a font manager 7;21 for the printer 2;30 where a document was to be printed out. Whenever the application 4 then identified a font to be included in a document, the printer driver 5 would then first check whether a requested font corresponded to one of the fonts for which embedded font data 11-1; . . . ; 11-n was stored in the embedded font memory of the printer 2;30. If this was not the case, the printer driver 5 would then make a font request to the font manager 7;21. In response, if appropriate font data 12-1; . . . ; 12-m for executing that part of a print job was stored in the printer memory 10 of the printer 2;30, the font manager 7;21 could then return an identifier to be included in the print job identifying the location of the required font data 12-1; . . . ; 12-m. At the same time the font manager 7;21 could set a flag associated with the font data 12; . . . ; 12-m for that font to prevent that font from being deleted prior to the execution of the print job being generated. If the required font data was determined not to be present in the printer memory 10, the font manager 7;21 would then record this and return a font not found message to the printer driver which would then proceed to include font data for that font in the print job. Subsequently after the print job had been executed the font manager 7;21 could then arrange for the missing font data to be downloaded into the printer memory 10 or use in subsequent print jobs.

Although in the above embodiments systems have been described where documents are generated by an application 4 invoking a printer driver 5, it will be appreciated that the claimed subject matter could be implemented in the absence of a printer driver 5. Thus for example in such embodiments, a font manager 7;21 could be arranged to interface with computer programs other than a printer driver 5 such as direct print applications which was arranged to give instructions to a printer 2;30. The identification of the fonts required by a direct print application could be achieved in a number of ways.

One approach would be for a font manager 7;21 to store a list of required fonts for each direct print application which might use a printer 2. When a print job was received the font manager 7;21 could use the identification of the application to determine the font data which should be downloaded into the printer memory 10.

Another alternative approach would be for the font manager 7;21 to scan the print stream for a print job created by a direct print application for font identifiers to generate a font usage table for an application and cause the download of identified fonts in response to determining that a font was not currently available. Alternatively, a print stream generated by an application could be parsed to identify the presence of font data and this could be utilised to identify fonts for downloading in response to future print jobs from that application.

Further in such embodiments, rather than downloading data in response to the identification of a print stream from a particular application, if it can be known in advance that a particular application is to be used and what fonts are being used these could be scheduled to be downloaded and removed at periodic times for example at the start and end of each working day.

In the embodiments described in detail above font data is described as being deleted either due to memory constraints or alternatively due to data being stored in volatile storage and a printer being switched off. In other embodiments, a printer could be arranged to clear font data from memory after a predetermined time period. Such an approach would have the advantage that stored font data could be guaranteed to be updated periodically and hence a printer would not use old or out-of-date font data for longer than a predetermined period of time.

It will also be appreciated that although in the first embodiment a specific way of selecting font data for deletion is described, other ways of selecting font data for deletion could be used.

Although in various above embodiments a system has been described in which a printer is provided with embedded fonts as well as fonts which are dynamically downloaded into a printer memory, it will be appreciate that the claimed subject matter can be utilised with printers which do not include any embedded font data.

Although in the above description fonts are described as being downloaded whenever required, sometimes the creation of copies of font data may be restricted. Normally such a restriction on copying data is indicated by the presence of certain check data as part of the font data 6-1; . . . ; 6-k stored on a computer 1. In some embodiments where such check data is available, in order to avoid generating unauthorised copies of font data, a font manager could be arranged to check such data to ensure that copy was permitted prior to causing a copy of font data being generated.

Although in the above description, reference has been made to the downloading of font data, it will be appreciated that the present subject matter is also applicable to other items of data which are utilised by printers to determine the appearance of printed documents such as overlays such as macros used to generate the appearance of headed note paper, forms denoting regions of a page in which to record responses to one or more questions or watermarks defining text or an image to be added to a printed page to enable different prints to be distinguished from one another.

Although in the above embodiments, the downloading of font data has been described as occurring under the control of a computer, it will be appreciated that the term computer should be interpreted broadly to encompass any computing device. In particular it will be appreciated that the described processes could be undertaken by a mobile computing devices such a laptop computer or a mobile phone having suitable software installed.

Although the embodiments of the subject matter described with reference to the drawings comprise computer apparatus and processes performed in computer apparatus, the subject matter also extends to computer programs, particularly computer programs on or in a carrier, adapted for putting the subject matter into practice. The program may be in the form of source or object code or in any other form suitable for use in the implementation of the processes according to the subject matter. The carrier can be any entity or device capable of carrying the program.

For example, the carrier may comprise a storage medium, such as a ROM, for example a CD ROM or a semiconductor ROM, or a magnetic recording medium, for example a floppy disc or hard disk. Further, the carrier may be a transmissible carrier such as an electrical or optical signal which may be conveyed via electrical or optical cable or by radio or other means.

When a program is embodied in a signal which may be conveyed directly by a cable or other device or means, the carrier may be constituted by such cable or other device or means.

Alternatively, the carrier may be an integrated circuit in which the program is embedded, the integrated circuit being adapted for performing, or for use in the performance of, the relevant processes.

What is claimed is:

1. A method of managing font data comprising:
pre-storing font data on a printer;
storing data identifying fonts for which font data is presently stored in a memory of the printer;
generating a list of fonts identifying fonts to be used when executing a print job other than fonts for which the font data has been pre stored;
identifying fonts in the print job to be executed for which font data is not already stored in the memory of the printer by comparing the generated list with the stored data;
generating the print job including the font data only for the identified fonts required for printing the print job which is not already present in the memory of the printer;
executing the generated print job;
downloading the font data corresponding to the identified fonts; and
storing the downloaded font data in the memory of the printer for use in executing subsequent print jobs.

2. The method of claim 1, wherein generating the print job including the font data corresponding to the identified fonts comprises generating the print job including the font data corresponding to the identified fonts and pointers identifying locations of the font data of fonts in the print job for which the font data is already stored in the memory of the printer.

3. The method of claim 1, wherein downloading the font data corresponding to the identified fonts comprises:
storing data identifying the use of items of stored font data;
determining whether the memory of the printer is sufficient to store the font data; and
if the memory of the printer is not sufficient to store the font data, utilizing the stored data to select one or more items of stored font data for deletion, prior to downloading the font data corresponding to the identified fonts.

4. The method of claim 3 wherein storing data identifying the use of items of stored font data comprises storing data identifying the time of use of items of stored font data and deleting stored font data which has not been used for the greatest period of time if the memory of the printer is not sufficient to store the font data to be downloaded.

5. The method of claim 3 wherein storing data identifying the use of items of stored font data comprises storing data identifying the frequency of use of items of stored font data and deleting stored font data which has been used least frequently if the memory of the printer is not sufficient to store the font data to be downloaded.

6. A method of managing font data comprising:
identifying fonts in a print job to be executed for which font data is not already stored in a memory of a printer;
generating a print job including the font data required for printing the print job which is not already present in the memory of the printer;
executing the generated print job;
downloading the font data corresponding to the identified fonts;

storing the downloaded font data in the memory of the printer for use in executing subsequent print job;

storing data identifying the time of storage of an item of the font data in the memory of the printer; and deleting an item of the font data from the memory of the printer after a predetermined period of time.

7. A method of managing font data comprising:

identifying fonts in a print job to be executed for which font data is not already stored in a memory of a printer;

generating a print job including the font data required for printing the print job which is not already present in the memory of the printer;

executing the generated print job;

checking whether the font data for the identified fonts is associated with data indicative of a restriction on copying of the font data;

downloading the font data corresponding to the identified fonts which are not associated data indicative of the restriction on copying; and storing the downloaded font data in the memory of the printer for use in executing subsequent print jobs.

8. A printing system comprising:

a computer operable to generate a print job including font data and cause the print job to be sent to a printer for execution; and the printer having:

a memory operable to store font data for use in executing print jobs and responsive to receipt of the print job to execute the received print job; and a font manager operable to identify fonts in the print job to be executed which are not already stored in the memory of the printer and cause font data corresponding to the identified fonts to be downloaded and stored in the memory of the printer for use in executing subsequent print jobs;

wherein the computer is arranged to include the font data in the print job for execution by the printer only for fonts for which font data is not already stored in the memory of the printer where the print job is to be executed.

9. The printing system of claim 8, wherein the printer includes pre-stored font data and wherein the font manager is operable to generate a list of fonts, identifying fonts to be used when executing the print job, other than fonts for which the font data has been pre-stored.

10. The printing system of claim 8, wherein the font manager is operable to delete an item of font data from the memory of the printer after a predetermined period of time.

11. A printing system comprising:

a printer having:

an embedded font memory storing font data for one or more embedded fonts;

a printer memory operable to store further font data for use in executing print jobs, wherein the printer is responsive to receipt of a print job to execute a received print job; and a computer operable to generate the print job including font data and cause the print job to be sent to the printer for execution, the computer being arranged to include font data in the print job required for printing the print job only for fonts other than embedded fonts stored in the embedded font memory and fonts for which font data is already stored in the printer memory of the printer where the print job is to be executed, wherein the computer further includes a font manager operable to generate a list of fonts in the print job to be executed which do not correspond to embedded fonts stored in the embedded font memory or fonts for which further font data is already stored in the printer memory of the printer and cause font data corresponding to the generated list of fonts to be downloaded and stored in the printer memory for use in executing subsequent print jobs.

12. The printing system of claim 11, wherein the font manager is operable to delete an item of font data from the printer memory after a predetermined period of time.

13. A printing system comprising:

a computer operable to generate a print job including font data required for printing the print job and cause the print job to be sent to the printer for execution;

the printer having a memory operable to store font data for use in executing print jobs and responsive to receipt of the print job to execute the received print job; and a printer server including a font manager operable to identify fonts in the print job to be executed which are not already stored in the memory of the printer and cause font data corresponding to the identified fonts to be downloaded and stored in the memory of the printer for use in executing subsequent print jobs;

wherein the computer is arranged to include the font data in the print job for execution by the printer only for fonts for which the font data is not already stored in the memory of the printer where the print job is to be executed.

14. The printing system of claim 13, wherein the printer includes pre-stored font data and wherein the font manager is operable to generate a list of fonts, identifying fonts to be used when executing the print job, other than fonts for which the font data has been pre-stored.

15. A non-transitory computer-readable medium encoded with instructions which when executed by a programmable computer cause the computer to:

store data identifying fonts for which font data is presently stored by a printer having a memory operable to store font data;

monitor print jobs to be executed by the printer;

generate a list of fonts identifying fonts to be used when executing a print job other than fonts which are pre-store on the printer;

identify fonts in the print job to be executed by the printer which are not already stored in the memory of the printer by comparing the generated list with the stored data; and cause font data corresponding to the identified fonts to be downloaded and stored in the memory of the printer for use in executing subsequent print jobs after the print job, including the identified fonts, has been dispatched to the printer.

16. The non-transitory computer-readable medium of claim 15 encoded with instructions which when executed by a programmable computer cause the computer to:

determine if the memory of the printer is sufficient to store the font data or the identified fonts to be downloaded and when the memory of the printer is not sufficient to store the font data or the identified fonts, select one or more items of stored font data for deletion.

17. The non-transitory computer-readable medium of claim 15 encoded with instructions which when executed by a programmable computer cause the computer to:

generate the print job including font data corresponding to the identified fonts and pointers identifying locations of font data of fonts in the print job for which font data is already stored in the memory of the printer and dispatch the generated print job to the printer.

18. The non-transitory computer-readable medium of claim 15 encoded with instructions which when executed by a programmable computer cause the computer to:

store data identifying the use of items of font data stored in the memory of the printer;

determine whether the memory of the printer is sufficient to store the font data for the identified fonts; and if the memory of the printer is not sufficient to store the font data for the identified fonts, utilize the stored data identifying the use of items to select one or more items of stored font data for deletion, prior to causing the font data corresponding to the identified fonts to be downloaded.

19. The non-transitory computer-readable medium of claim 18 encoded with instructions which when executed by a programmable computer cause the computer to:

store data identifying the time of use of items of stored font data; and cause stored font data which has not been used for the greatest period of time to be deleted if the memory of the printer is not sufficient to store the font data to be downloaded.

20. The non-transitory computer-readable medium of claim 18 encoded with instructions which when executed by a programmable computer cause the computer to:

store data identifying the frequency of use of items of stored font data; and cause stored font data which has been used least frequently to be deleted if the memory of the printer is not sufficient to store the font data to be downloaded.

21. The non-transitory computer-readable medium of claim 15 encoded with instructions which when executed by a programmable computer cause the computer to:

store data identifying the time of storage of items of font data in the memory of the printer; and cause items of font data to be deleted from the memory of the printer after a predetermined period of time.

22. The non-transitory computer-readable medium of claim 15 encoded with instructions which when executed by a programmable computer cause the computer to:

check whether the font data for the identified fonts is associated with data indicative of a restriction on copying of the font data; and cause font data corresponding to the identified fonts which are not associated data indicative of the restriction on copying to be downloaded.

* * * * *